(12) United States Patent
Al Otaibi

(10) Patent No.: US 11,118,715 B2
(45) Date of Patent: Sep. 14, 2021

(54) SEGMENT ISOLATION OF INTERNAL PIPE WALL

(71) Applicant: Saudi Arabian Oil Company, Dhahran (SA)

(72) Inventor: Abdulaziz Maged Al Otaibi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 176 days.

(21) Appl. No.: 16/514,417

(22) Filed: Jul. 17, 2019

(65) Prior Publication Data

US 2021/0018132 A1    Jan. 21, 2021

(51) Int. Cl.
| *F16L 55/128* | (2006.01) |
| *F16L 55/18* | (2006.01) |
| *F16L 55/1645* | (2006.01) |
| *F16L 101/30* | (2006.01) |

(52) U.S. Cl.
CPC ......... *F16L 55/128* (2013.01); *F16L 55/1645* (2013.01); *F16L 55/18* (2013.01); *F16L 2101/30* (2013.01)

(58) Field of Classification Search
CPC ..... F16L 55/128; F16L 55/18; F16L 55/1645; F16L 55/163; F16L 55/132; F16L 55/134; F16L 41/04; F16L 2101/30; E21B 23/001
See application file for complete search history.

(56) References Cited

U.S. PATENT DOCUMENTS

| 5,029,614 A | 7/1991 | Lara et al. |
| 5,844,127 A * | 12/1998 | Berube ............... G01M 3/022 |
| | | 73/49.8 |
| 5,924,454 A | 7/1999 | Dyck et al. |
| 6,601,437 B2 | 8/2003 | Gotowik |
| 7,240,697 B2 | 7/2007 | Beebe et al. |
| 7,296,597 B1 | 11/2007 | Freyer et al. |

(Continued)

FOREIGN PATENT DOCUMENTS

| JP | 54150718 A * | 11/1979 | ............. F16L 55/18 |
| JP | 54150718 A | 11/1979 | |

(Continued)

OTHER PUBLICATIONS

International Search Report and Written Opinion for related PCT application PCT/US2020/042436 dated Oct. 29, 2020, pp. 1-14.

*Primary Examiner* — George S Gray
(74) *Attorney, Agent, or Firm* — Bracewell LLP; Constance G. Rhebergen; Linda L. Morgan

(57) ABSTRACT

A method for isolating and performing work on a segment of a pipe includes delivering an isolation tool to a target location. A first seal member is actuated to form an annular seal around an outer surface of the isolation tool. A second ring body is moved away from a first ring body, elongating an isolation sheet that extends between the first ring body and the second ring body. The isolation sheet defines an annular work space between the outer diameter of the isolation sheet and the inner diameter of the pipe. A second seal member is actuated to form an annular seal around the outer surface of the isolation tool. A pressure within the annular work space is reduced by removing fluids within the annular work space with an ejector device. Work is performed within the annular work space with a tool assembly.

15 Claims, 9 Drawing Sheets

(56) References Cited

U.S. PATENT DOCUMENTS

| | | | |
|---|---|---|---|
| 7,779,676 | B2 | 8/2010 | Carson |
| 9,644,448 | B2 | 5/2017 | Berube et al. |
| 9,857,014 | B2 | 1/2018 | Carson et al. |
| 2008/0209986 | A1* | 9/2008 | Carson ................ G01M 3/2884 73/49.8 |
| 2014/0020782 | A1 | 1/2014 | Early et al. |

FOREIGN PATENT DOCUMENTS

| | | |
|---|---|---|
| JP | 61188007 A | 8/1986 |
| JP | 2001116180 A | 4/2001 |
| WO | 2007141554 A1 | 12/2007 |

* cited by examiner

SEGMENT ISOLATION OF INTERNAL PIPE WALL

BACKGROUND OF THE DISCLOSURE

1. Field of the Disclosure

The present disclosure relates to performing repair, maintenance, or operations on fluid flow pipeline, and more particularly to the isolation of a portion of a segment of the pipeline for performing such operations.

2. Description of the Related Art

There may be times when an operator is required to perform certain operations within a pipe. As an example, an operator may need to connect the pipe to another pipe, or may need to repair or otherwise treat a section of existing pipe. It may be desirable to perform such operations without stopping the flow of fluids through the pipe.

For example, if the pipe is transporting fluids associated with hydrocarbon development, production, refining, or transportation, there may be times when it is desirable or required to perform operations within the pipe while the fluids remain flowing through the pipe so that the hydrocarbon development, production, refining and transportation activities are unaffected, or at most, minimally affected.

SUMMARY OF THE DISCLOSURE

Embodiments of this disclosure provide systems and methods for isolating a segment of a pipe for performing operations on or at such segment of the pipe wall while fluids continue to flow through the pipe. The systems and methods of this disclosure can be used, as an example, for operations within the pipe that require a hot tap for creating new fluid flow paths through additional piping, or to repair a defect in an internal surface of the pipe. The system can be inserted inside the pipe and can travel to the target location within the pipe where the segment of the pipe is to be isolated. The system can isolate the segment of the pipe and define an annular work space at the segment of the pipeline. The pressure within the annular work space can be reduced and fluid within the annular workspace can be removed before the operations taking place within the annular work space are performed.

In an embodiment of this disclosure, a method for isolating and performing work on a segment of a pipe through which a fluid flows includes delivering an isolation tool to a target location of a bore of the pipe. The isolation tool has a first ring body and a second ring body. A first seal member of the first ring body is actuated. The first seal member forms an annular seal between an outer diameter surface of the isolation tool and an inner diameter surface of the pipe. The second ring body is moved in a direction away from the first ring body, elongating an isolation sheet that extends between the first ring body and the second ring body. The isolation sheet has a smaller maximum outer diameter than an inner diameter of the pipe, defining an annular work space between an outer diameter surface of the isolation sheet and the inner diameter surface of the pipe. A second seal member of the second ring body is actuated. The second seal member forms an annular seal between the outer diameter surface of the isolation tool and the inner diameter surface of the pipe. A pressure within the annular work space is reduced by removing fluids within the annular work space with an ejector device of the isolation tool. Work is performed within the annular work space with a tool assembly of the isolation tool. The pressure of the annular work space is balanced with a pressure of the bore of the pipe. The first seal member is released. The first ring body is moved in a direction towards the first ring body, compacting the isolation sheet. The second seal member is released. The isolation tool is retrieved from the bore of the pipe.

In alternate embodiments, before actuating the first seal member, brakes of a tool body of the isolation tool can be applied to maintain a position of the isolation tool within the pipe. Before retrieving the isolation tool, the brakes can be released. The tool assembly can be moved around a circumference of the isolation tool along a ring shaped tool guide. The first ring body can include a tool cavity with a sealed tool door. Performing work within the annular work space can further include moving the tool door axially towards the second ring body, to unseal and open the tool cavity, and moving the tool assembly axially towards the second ring body and out of the tool cavity, providing the tool assembly access to the annular work space.

In other alternate embodiments, the method can further include rotating an end of the tool assembly radially outward so that individual tools of the tool assembly are moved closer to an inner surface of the pipe. The isolation tool can include a tool frame including a central beam located along a central axis of the isolation tool, a first ring frame located axially outward of the first ring body, a second ring frame located axially outward of the second ring body, a plurality of spokes extending radially outward from the central beam, and a plurality of support beams extending between the first ring frame and the second ring frame.

In other alternate embodiments, the isolation tool can have a tool bore in fluid communication with the bore of the pipe. The tool bore can provide a fluid flow path through the isolation tool for bore fluids. The ejector device can include a jet pump and the bore fluids can be a motive fluid for the jet pump as the jet pump removes the fluids within the annular work space. Elongating the isolation sheet can be performed by a force of a flow of bore fluids through the tool bore.

In an alternate embodiment of this disclosure, a system for isolating and performing work on a segment of a pipe through which a fluid flows includes an isolation tool having a first ring body and a second ring body and located at a target location of a bore of the pipe. A first seal member of the first ring body forms an annular seal between an outer diameter surface of the isolation tool and an inner diameter surface of the pipe when the first seal member is in an actuated position. An isolation sheet extends between the first ring body and the second ring body. The isolation sheet has a smaller maximum outer diameter than an inner diameter of the pipe, defining an annular work space between an outer diameter surface of the isolation sheet and the inner diameter surface of the pipe. The isolation sheet is movable to an elongated position when the second ring body is moved in a direction away from the first ring body, and moveable to a compacted position when the first ring body is moved in a direction towards the first ring body. A second seal member forms an annular seal between the outer diameter surface of the isolation tool and the inner diameter surface of the pipe when the second seal member is in an actuated position. An ejector device of the isolation tool is operable to reduce a pressure within the annular work space by removing fluids within the annular work space. A tool assembly of the isolation tool is operable for performing the work within the annular work space.

In alternate embodiments, brakes of a tool body of the isolation tool can maintain a position of the isolation tool within the pipe when applied. The brakes can be moveable to a released position for retrieving the isolation tool. A ring shaped tool guide can be oriented to provide a path for moving the tool assembly around a circumference of the isolation tool. The first ring body can include a tool cavity with a sealed tool door. The door can be movable axially towards the second ring body to unseal and open the tool cavity.

In other alternate embodiments, the tool assembly can include a hinge member operable to allow the tool assembly to rotate radially outward so that individual tools of the tool assembly are moved closer to an inner surface of the pipe. The isolation tool can include a tool frame including a central beam located along a central axis of the isolation tool, a first ring frame located axially outward of the first ring body, a second ring frame located axially outward of the second ring body, a plurality of spokes extending radially outward from the central beam, and a plurality of support beams extending between the first ring frame and the second ring frame. The isolation tool can have a tool bore in fluid communication with the bore of the pipe, the tool bore providing a fluid flow path through the isolation tool for bore fluids, and where the ejector device includes a jet pump. The bore fluids can be a motive fluid for the jet pump as the jet pump removes the fluids within the annular work space.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
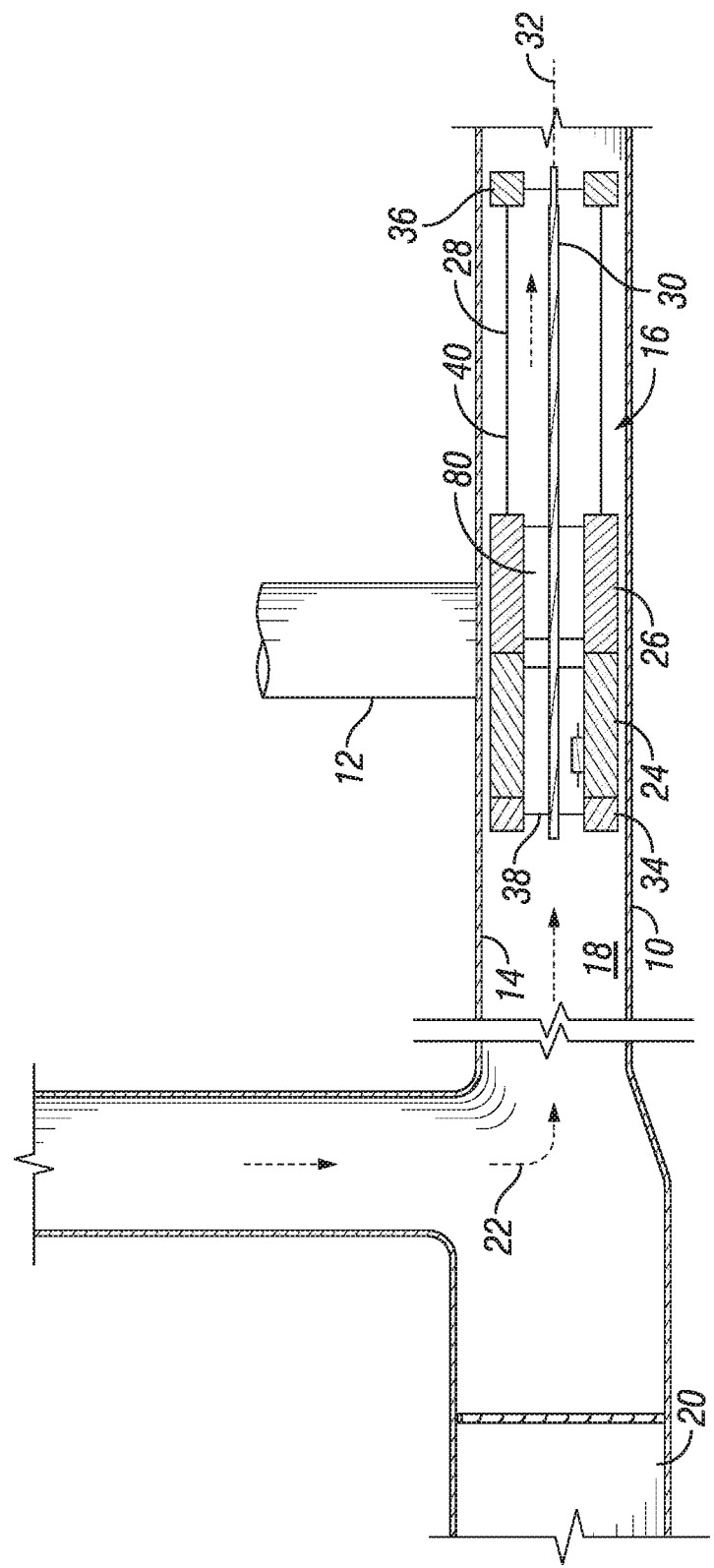
FIG. 1 is a schematic elevation section view of a pipe with an isolation tool, in accordance with an embodiment of this disclosure, with the isolation tool shown in a disengaged position.

Looking at FIG. 1, pipe 10 can transport a flow of fluids. In embodiments of this disclosure, the fluids within pipe 10 can be associated with hydrocarbon development, production, refining, or transportation. Pipe 10 can transport a flow of fluid that contains a liquid, a gas, or a combination of liquid and gas. Pipe 10 can be formed of a metal material or other material that can support the use of an inductive proximity sensor system.

There may be times when an operation on or through an inner surface or wall of pipe 10 may be desired or required. As an example, an operator may want to create an opening through pipe 10 to access a branch 12. Branch 12 can be a separate tubular member or pipe that has been sealingly secured to pipe 10. A fluid flow path can then be created to provide fluid communication between pipe 10 and branch 12. As an example, a hole can be cut in a sidewall of pipe 10 at the location of branch 12 so that fluid can flow through such hole between pipe 10 and branch 12. Making a fluid connection between pipe 10 and pipe branch 12 without interrupting the flow of fluid through pipe 10 is known as a "hot tap".

Alternately, there may be imperfections on an inner diameter surface 14 of pipe 10 that could be repaired, or other inner surface maintenance work that could be completed. Such operations may be undertaken pipe 10 when fluid continues to flow through pipe 10 at a normal operating pressure. As an example, the flow through pipe 10 can have a pressure in a range of 200 to 1500 pounds per square inch (psi).

Isolation tool 16 can be used to isolate a segment of pipe 10. The term "segment" as used in this disclosure means a length of pipe 10 that is selected to be isolated from adjacent portions of pipe 10. In embodiments where a branch 12 is included, the term "segment" further includes the length of branch 12 that is in fluid communication with pipe 10.

Looking at FIG. 1, isolation tool 16 is shown schematically in a disengaged position. In the disengaged position, a largest outer diameter of isolation tool 16 is smaller than the smallest diameter of pipe bore 18 of pipe 10. In the disengaged position isolation tool 16 can be delivered to the target location of pipe bore 18 of pipe 10 through pipe bore 18.

Isolation tool 16 can be delivered to the target location through pipe bore 18 by loading isolation tool 16 into launcher 20 of pipe 10. Launcher 20 can be for example, a scraper launcher, or similar type launcher known in the art. After isolation tool 16 is launched into pipe 10 from launcher 20, the flow of fluid 22 though pipe 10 can move isolation tool 16 through pipe 10 to the target location.

Looking at FIG. 1, isolation tool 16 includes first ring body 24 and second ring body 26, which are shown schematically. First ring body 24 and second ring body 26 are each ring shaped members with an open central bore. Further details relating to first ring body 24 and second ring body 26 are shown in subsequent figures. When isolation tool 16 is in the disengaged of FIG. 1, isolation tool 16 is also in a contracted position. In the contracted position, first ring body 24 and second ring body 26 are located adjacent to each other in an axially upstream half of isolation tool 16. First ring body 24 is located upstream of second ring body 26.

Figure 9:
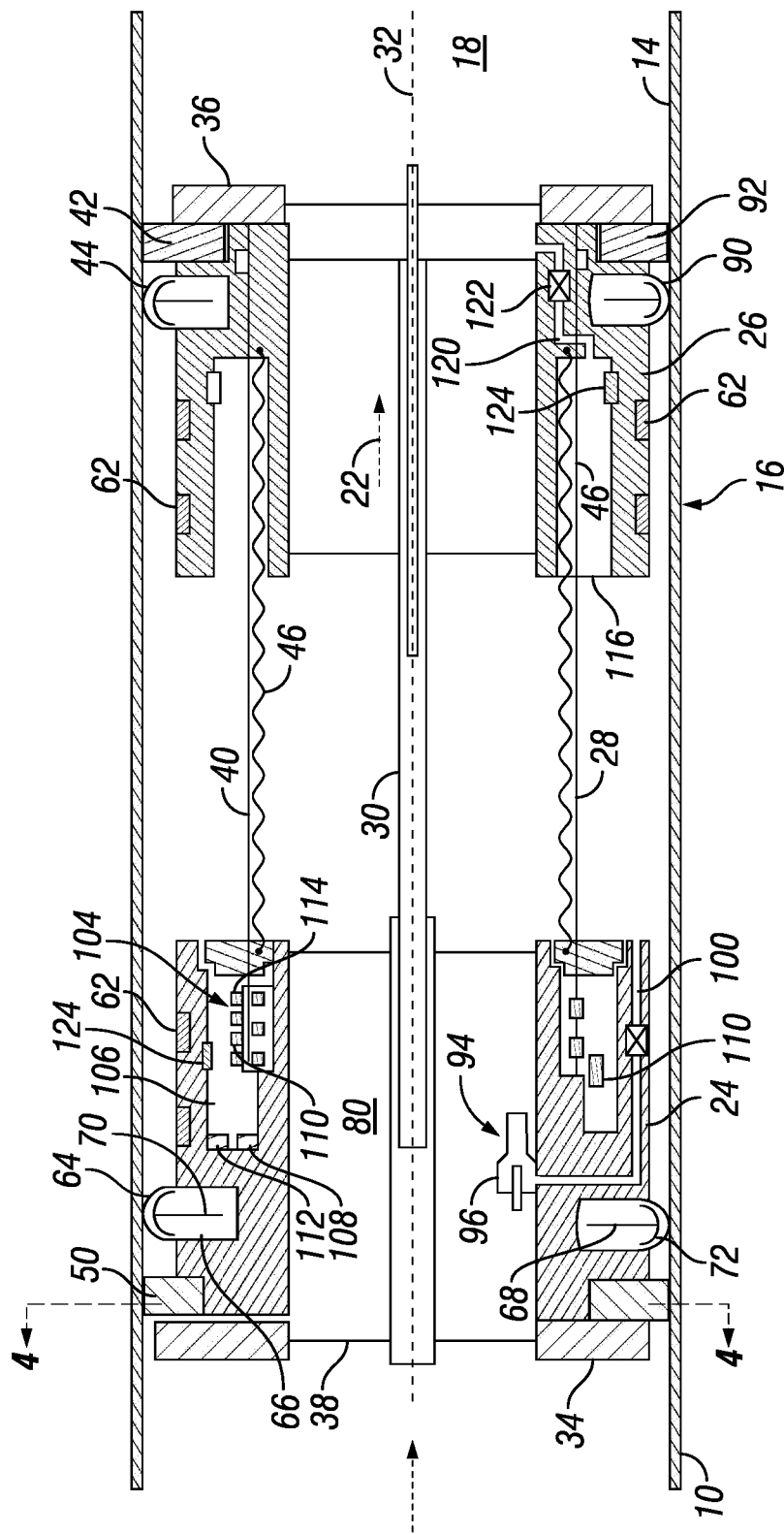
FIG. 9 is an elevation section view of an isolation tool, in accordance with an embodiment of this disclosure, with the isolation tool shown in an engaged position.

First ring body 24 and second ring body 26 are supported by tool frame 28. Tool frame 28 can support both static and moving components of first ring body 24 and second ring body 26. Tool frame 28 can further guide the movement of components of isolation tool 16. As an example, components of tool frame 28 can guide second ring body 26 as isolation tool 16 moves between the contracted position of FIGS. 1 and 3, and the extended position of FIGS. 2 and 9. Avoidance of heat exchange between fluid flowing through pipe 10 and the components of isolation tool 16 is important. As an example, electronic parts and any power sources of isolation tool 16 can be sensitive to excessive heat. It is desirable to avoid the transfer of heat from the fluid flowing through pipe 10 and such components. Therefore, the material used to form isolation tool 16, such as the material used to form tool frame 28, can be selected to minimize heat transfer. The material used to form tool frame 28 can be, for example a fiberglass.

Tool frame 28 includes central beam 30. Central beam 30 can extend along central axis 32 of isolation tool 16. Central beam 30 can included nested or telescoping elongated members that can accommodate the movement of isolation tool 16 between the contracted position of FIGS. 1 and 3, and the extended position of FIGS. 2 and 9. Central beam 30 can assist in supporting and guiding second ring body 26 as isolation tool 16 moves between the contracted position of FIGS. 1 and 3, and the extended position of FIGS. 2 and 9.

Tool frame 28 can further include first ring frame 34 and second ring frame 36. First ring frame 34 is located axially outward of first ring body 24. First ring frame 34 and second ring frame 36 are ring shaped members that circumscribe central beam 30 and are coaxial with central beam 30. Central beam 30 extends axially between first ring frame 34 and second ring frame 36 and is mechanically connected to first ring frame 34 and second ring frame 36 by spokes 38.

Spokes 38 extend radially outward from central beam 30. Certain spokes 38 can extend between first ring frame 34 and central beam 30. Other spokes can extend between second ring frame 36 and central beam 30. Still other spokes can extend between first ring body 24 or second ring body 26 and central beam 30. Spokes 38 can support and position both first ring body 24 and second ring body 26.

Tool frame 28 can further include support beams 40. Support beams 40 can extend axially between first ring frame 34 and second ring frame 36. Support beams 40 can be elongated members, such as wire or a tubular members.

Figure 2:
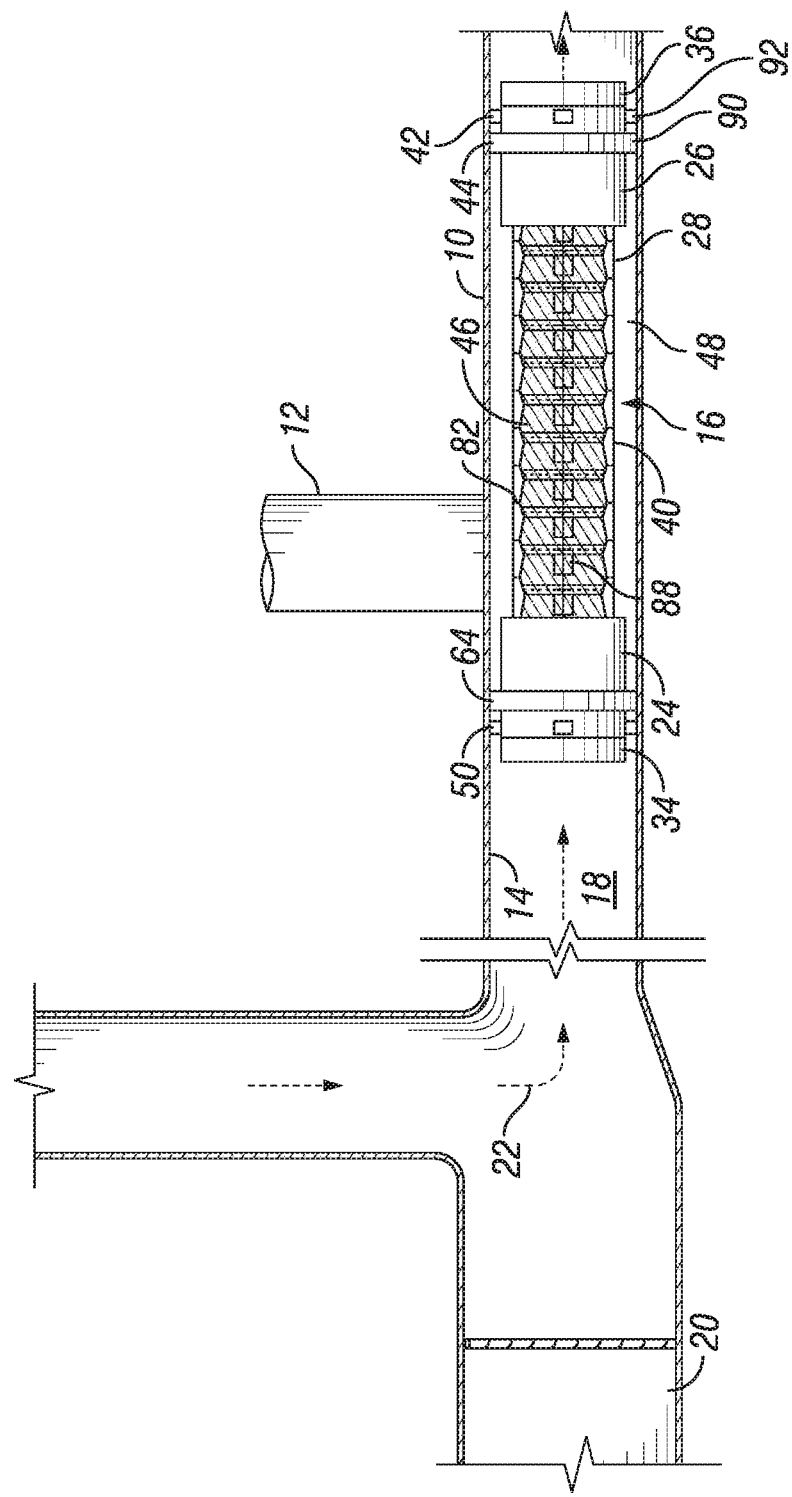
FIG. 2 is a schematic elevation view of a pipe with an isolation tool, in accordance with an embodiment of this disclosure, with the isolation tool shown in an engaged position.

Looking at FIG. 2, isolation tool 16 is shown schematically in an engaged position. In the engaged position, brake system 42 and seal members 44 of isolation tool 16 engage the inner diameter surface of pipe bore 18 of pipe 10. In the engaged position of FIG. 2, isolation tool 16 is also in the extended position. In the extended position, first ring body 24 and second ring body 26 are spaced axially apart, with first ring body 24 proximate to an upstream end of isolation tool 16 and second ring body 26 predicated to a downstream end of isolation tool 16.

Figure 3:
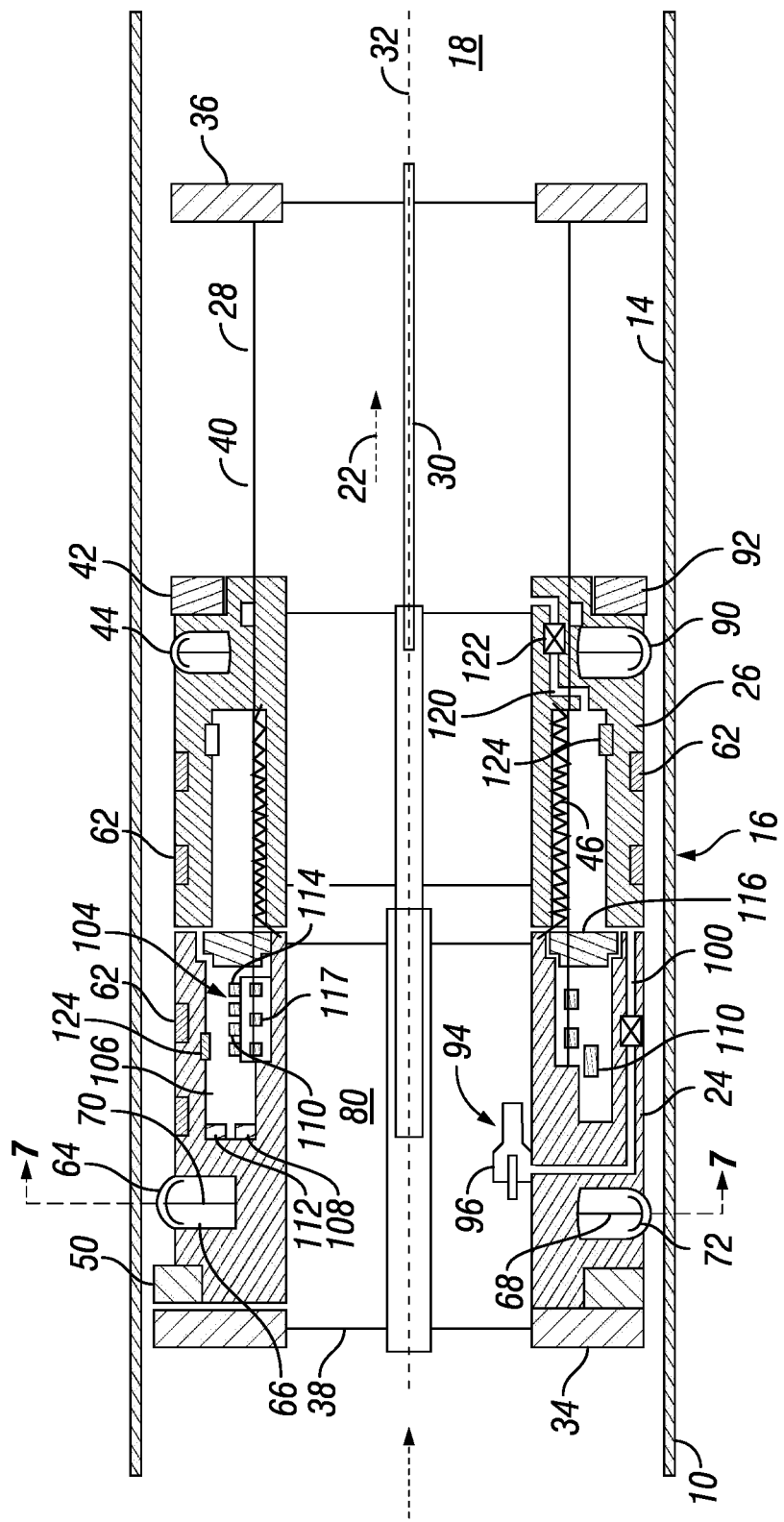
FIG. 3 is an elevation section view of an isolation tool, in accordance with an embodiment of this disclosure, with the isolation tool shown in a disengaged position.

When isolation tool 16 is in the extended position, isolation sheet 46 extends between first ring body 24 and second ring body 26. Isolation sheet 46 can be sealingly secured at a first end to first ring body 24 and can be sealingly secured at a second end to second ring body 26. Isolation sheet 46 can be a tube with a corrugated shape. When isolation tool 16 is in the extended position of FIG. 2, isolation sheet 46 is elongated. When elongated, the distance measured radially between the peaks and valleys of the corrugations of isolation sheet 46 is smaller compared to when isolation sheet 46 is contracted (FIG. 3).

When isolation tool 16 is in the extended position, isolation sheet 46 has a smaller maximum outer diameter than the inner diameter of pipe bore 18 of pipe 10, defining annular work space 48 between the outer diameter of isolation sheet 46 and the inner diameter of pipe bore 18 of pipe 10. An operation can be performed on inner diameter surface 14 of pipe 10 within annular work space 48. In the example embodiment of FIG. 2, such operation could include hot tapping branch 12, or performing maintenance or repair work on inner diameter surface 14 of pipe 10. Before performing such operation within annular work space 48, fluids and pressure within annular work space 48 can be reduced to provide suitable working conditions within annular work space 48.

In an example of operation, Looking at FIG. 1, in order to isolate a segment of pipe 10 to perform an operation on inner diameter surface 14 of pipe 10, isolation tool 16 can be delivered to a target location along pipe 10. Isolation tool 16 can be loaded into launcher 20 with the tools and equipment required to perform the operation located on-board isolation tool 16. Isolation tool 16 can be launched into pipe bore 18 from launcher 20. The force of the flow of fluid 22 through pipe bore 18 can carry isolation tool 16 to the target location within pipe bore.

Looking at FIG. 2, when isolation tool 16 reaches the target location within pipe bore 18, upstream brakes 50 of brake system 42 can be applied to releasably secure isolation tool 16 within pipe bore 18 and to maintain the position of isolation tool 16 within pipe 10. Upstream brakes 50 are applied upstream of the location where the operation on pipe 10 is to take place.

Figure 4:
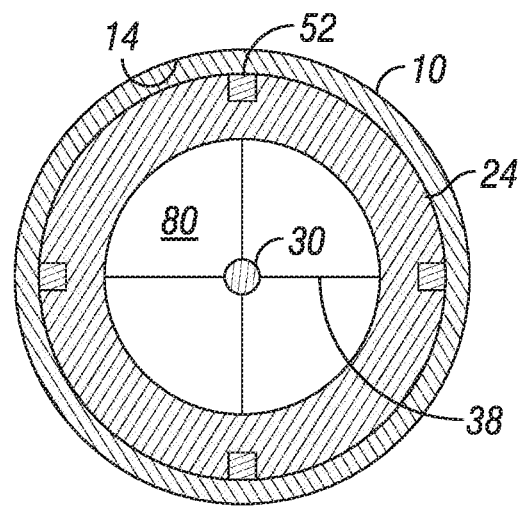
FIG. 4 is a cross sectional view of a brake system of an isolation tool in accordance with an embodiment of this disclosure, shown with a brake wedge spaced apart from the inner diameter surface of the pipe.
Figure 5:
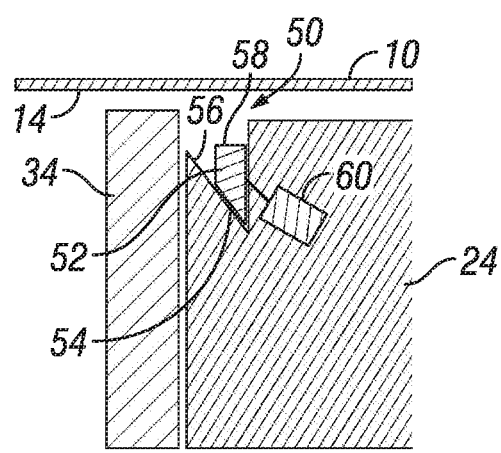
FIG. 5 is an elevation view of a brake system of an isolation tool in accordance with an embodiment of this disclosure, shown with the brake wedge spaced apart from the inner diameter surface of the pipe.
Figure 6:
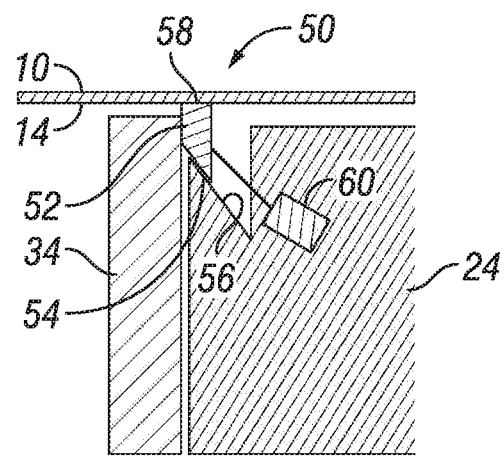
FIG. 6 is an elevation view of a brake system of an isolation tool in accordance with an embodiment of this disclosure, shown with the brake wedge engaging the inner diameter surface of the pipe.

Looking at FIGS. 4-6, in an example embodiment brakes system 42 can include a plurality of brake wedges 52 are spaced around a circumference of each ring body. In the example of FIG. 4, four brake wedges 52 are shown. Looking at FIG. 5, brake wedge 52 can have a sloped surface 54 that is on a radially inward face of brake wedge 52. Sloped surface 54 can have a sloped that is substantially similar to a slope of angled surface 56 of the ring body. Angled surface 56 faces radially outward and defines a pocket within the ring body into which brake wedge 52 is retained. Sloped surface 54 of brake wedge 52 can engage angled surface 56 of the ring body so that brake wedge 52 can slide along angled surface 56.

Brake wedge 52 can have brake surface 58 on a radially outward face that is opposite to brake wedge 52. Brake surface 58 can engage inner diameter surface 14 of pipe 10. In FIG. 5 brake wedge 52 is shown spaced apart from inner diameter surface 14 of pipe 10. In such a position brake system 42 is not engaged and isolation tool 16 can travel through pipe 10. In FIG. 6 brake wedge 52 is shown engaging inner diameter surface 14 of pipe 10. In such a position brake system 42 is engaged and isolation tool 16 cannot travel through pipe 10.

Brake actuator 60 can be used to move brake wedge 52 between the position spaced apart from inner diameter surface 14 of pipe 10 of FIG. 5, and the position engaging inner diameter surface 14 of pipe 10 of FIG. 6. Brake actuator 60 can move brake wedge 52 along angled surface 56. Because of the angle of angled surface 56, as brake wedge 52 is moved in a direction away from brake actuator 60, brake wedge 52 will also move in a radially outward direction to engage inner diameter surface 14 of pipe 10. As brake wedge 52 is moved in a direction towards from brake actuator 60, brake wedge 52 will also move in a radially inward direction so that brake surface 58 is spaced apart from inner diameter surface 14 of pipe 10.

Looking at FIG. 3, isolation tool 16 can further include sensor system 62. Sensor system 62 can include electromagnetic signal senders and receivers. Sensor system 62 can measure the distance that isolation tool 16 has traveled within pipe bore 18. Sensor system 62 can be preprogrammed with input data and isolation tool 16 can automatically perform the desired actions based on the input data. As an example, sensor system 62 can be preprogrammed with a distance to a defect or a location of interest and isolation tool 16 can automatically travel such distance or to such location. As an example, sensor system 62 can be an inductive proximity sensor system that relies on Faraday's law of induction to determine the distance that isolation tool 16 has traveled.

After isolation tool 16 has been stopped at the target location with brake system 42, first seal member 64 of first ring body 24 can be actuated to form an annular seal between an outer diameter surface of isolation tool 16 and inner diameter surface 14 of pipe 10. First seal member 64 is one of the seal members 44. A seal member 44 can extend across seal groove 66 of each of first ring body 24 and second ring body 26.

Seal actuator ring 68 can be used to actuate seal member 44. Seal actuator ring 68 is located within seal groove 66. Seal actuator ring 68 can be ring shaped and have a generally "T" shape in cross section. Base 70 of seal actuator ring 68 can extend radially relative to central axis 32. Hat portion 72 of seal actuator ring 68 can be located at a radially outward end of base 70 of seal actuator ring 68. Hat portion 72 of seal actuator ring 68 can curve from where hat portion 72 is secured to base 70 so that hat portion 72 is not completely perpendicular to base 70.

Figure 7:
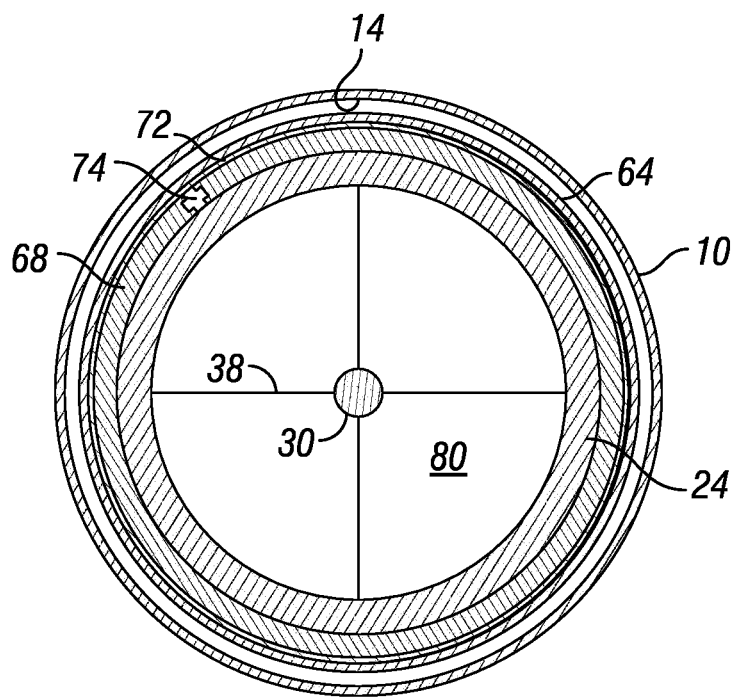
FIG. 7 is a cross sectional view of a seal member of an isolation tool, in accordance with an embodiment of this disclosure, shown with the seal member spaced apart from the inner diameter surface of the pipe.
Figure 8:
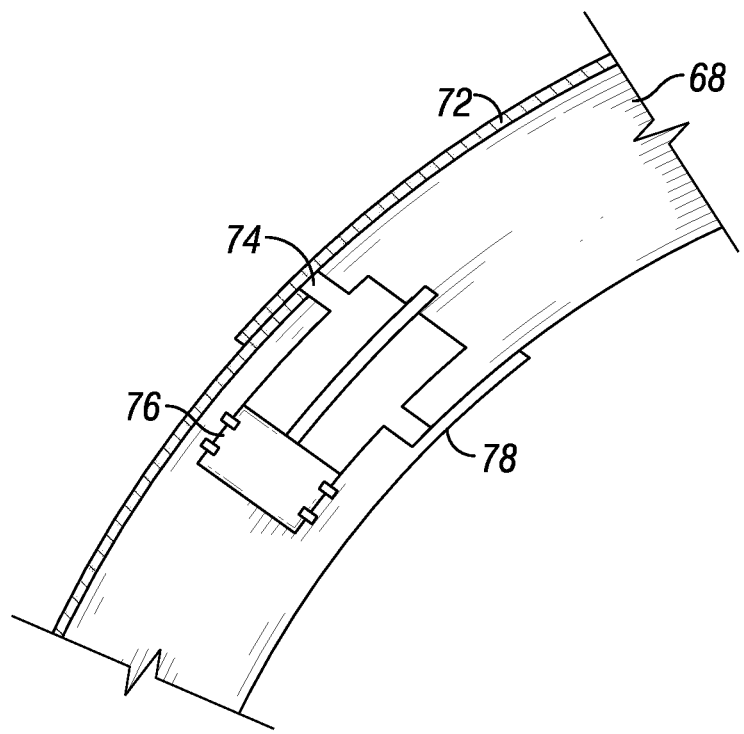
FIG. 8 is a detail cross sectional view of the seal ring expansion mechanism of the seal member of an isolation tool, in accordance with an embodiment of this disclosure.

Looking at FIGS. 7-8, seal actuator ring 68 can be a split ring that can be separated or opened at gap 74 to expand seal actuator ring 68. Split ring motor 76 can be used to move pin 78, which extends across gap 74. As pin 78 is moved in a direction away from split ring motor 76, gap 74 widens and the diameter of seal actuator ring 68 enlarges. As seal actuator ring 68 enlarges, hat portion 72 of seal actuator ring 68 pushes seal member 44 radially outward and into sealing engagement with inner diameter surface 14 of pipe 10.

In order to disengage seal member 44 from engagement with inner diameter surface 14 of pipe 10, split ring motor 76 can be used to move pin 78 in a direction towards split ring motor 76, reducing the size of gap 74 and reducing the diameter of seal actuator ring 68.

With upstream brakes 50 and first seal member 64 engaging inner diameter surface 14 of pipe 10, first ring body 24 is static axially relative to pipe 10 and no fluid within pipe bore 18 can pass first seal member 64 between the outer diameter surface of isolation tool 16 and inner diameter surface 14 of pipe 10. Isolation tool 16 has tool bore 80 in fluid communication with pipe bore 18 of pipe 10. Tool bore 80 provides a fluid flow path through isolation tool 16 for bore fluids so that the flow of fluid 22 though pipe 10 can continue through isolation tool 16 uninterrupted during the installation of isolation tool 16, the performance of the required operation within annular work space 48 and the retrieval of isolation tool 16.

With upstream brakes 50 and first seal member 64 engaging inner diameter surface 14 of pipe 10, second ring body 26 can move in a direction away from first ring body 24 due to drag on second ring body 26 from the fluid of fluid 22 through tool bore 80. Looking at FIGS. 2 and 9, as second ring body 26 moves in a direction away from first ring body 24, isolation sheet 46 is elongated axially.

Figure 10:
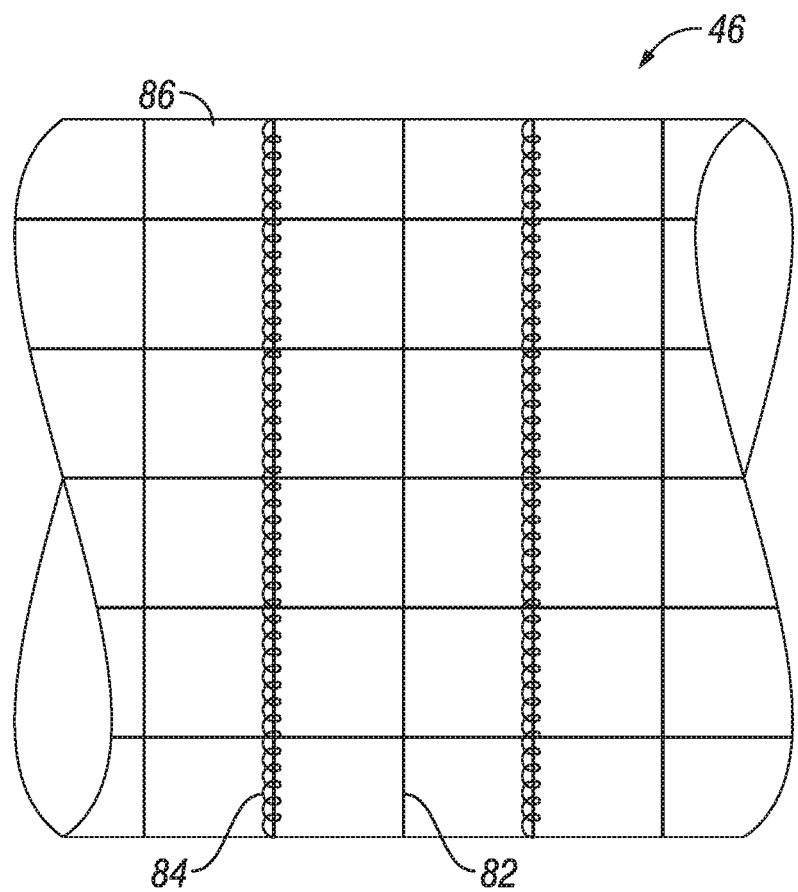
FIG. 10 is an elevation view of an isolation sheet of an isolation tool, in accordance with an embodiment of this disclosure.
Figure 11:
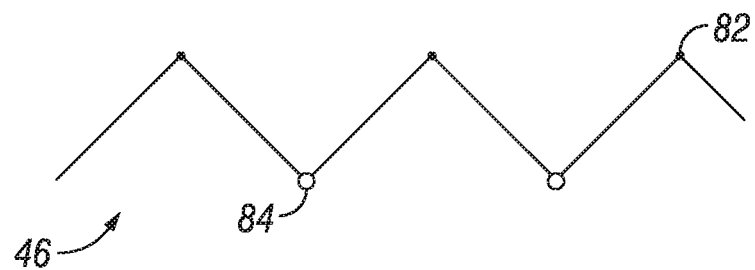
FIG. 11 is a partial cross section view of an isolation sheet of an isolation tool, in accordance with an embodiment of this disclosure.

Looking at FIG. 3, when isolation sheet 46 is contracted, isolation sheet 46 can be stored within an annular or ring shaped cavity of second ring body 26. Looking at FIGS. 10-11, isolation sheet 46 is a flexible and reinforced tubular member. Isolation sheet 46 is corrugated, with peaks 82 that extend circumferentially and are radially outward of valleys 84. In the example embodiment of FIGS. 10-11, valleys 84 have springs that allow for elongation of isolation sheet 46 and bias isolation sheet 46 towards the contracted position of FIGS. 1 and 3. Peaks 82 can include metal rings that secure the columns of isolation sheet 46 together on either side of a peak.

Isolation sheet 46 is a sealed tubular member that can withstand the pressures and temperatures of the conditions within pipe 10. Isolation sheet 46 is sealingly secured to first ring body 24 and second ring body 26. Isolation sheet 46 together with first ring body 24, second ring body 26 and seal members 44 define annular work space 48 as a sealed space between the outer diameter surface of isolation tool 16 and inner diameter surface 14 of pipe 10, which is capable of withstanding a pressure differential.

Isolation sheet 46 is fabricated to withstand a pressure differential between the outer diameter surface of isolation tool 16 and inner diameter surface 14 of pipe 10. As an example, isolation sheet 46 can be reinforced with fibrous material 86, such as metal string or plastic fibers. Alternately, isolation sheet 46 can be reinforced with plates 88 (FIG. 2), such as metal plates or plastic plates.

Looking at FIG. 2, isolation sheet 46 can be guided and supported by support beams 40. Isolation sheet 46 can be slidingly connected to support beams 40 so that as isolation sheet moves between the elongated and contracted positions, isolation sheet 46 can slide along support beams 40. In the example embodiment of FIG. 2, peaks 82 are slidingly connected to support beams 40, such as with hooks or loops that extend from peak 82 and around support beam 40.

After isolation sheet 46 has been extended second ring body 26 is spaced apart from first ring body 24, second seal member 90 can be actuated to form an annular seal between an outer diameter surface of isolation tool 16 and inner diameter surface 14 of pipe 10. Second seal member 90 is one of the seal members 44. Seal actuator ring 68 can be used to actuate second seal member 90. Second seal member 90 engages inner diameter surface 14 of pipe 10 downstream of the location where the operation on pipe 10 is to take place. Therefore the location where the operation on pipe 10 is to take place is located between first seal member 64 and second seal member 90.

After isolation sheet 46 has been extended second ring body 26 is spaced apart from first ring body 24, downstream brakes 92 of brake system 42 can be applied to assist in releasably securing isolation tool 16 within pipe bore 18. Downstream brakes 92 are applied downstream of the location where the operation on pipe 10 is to take place. Therefore the location where the operation on pipe 10 is to take place is located between upstream brakes 50 and downstream brakes 92.

After annular work space 48 has been pressure and fluid sealed by isolation sheet 46 together with first ring body 24, second ring body 26, seal members 44, and the outer diameter surface of isolation tool 16 and inner diameter surface 14 of pipe 10, the pressure within annular work space 48 can be generally equivalent to the pressure of pipe bore 18. In order to perform the operation within annular work space 48, pressure within annular work space 48 can be reduced and fluid trapped within annular work space 48 can be removed. In an example embodiment, pressure within annular work space 48 can be reduced to atmospheric pressure. Ejector device 94 can be used to remove fluids from annular work space 48.

Figure 12:
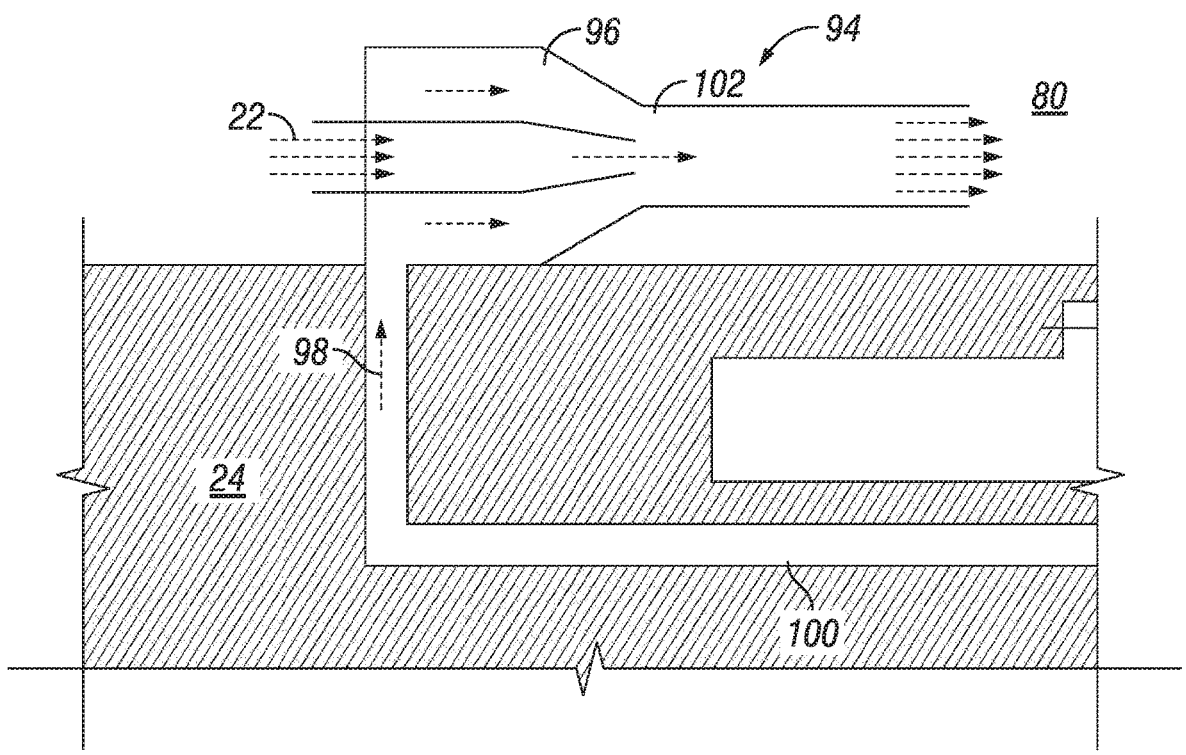
FIG. 12 is an elevation view of an ejector device of an isolation tool, in accordance with an embodiment of this disclosure.

In an example embodiment of FIG. 12, ejector device includes jet pump 96. Bore fluids that make up flow of fluids 22 can be the motive fluid for jet pump 96 to remove annular fluids 98. Jet pump 96 can be in fluid communication with annular work space 48 by way of annular fluid line 100. When the flow of fluids 22 passes through throat section 102 of jet pump 96, a suction is created that draws annular fluids 98 from annular work space 48 through annular fluid line 100. The combined flow of fluids 22 and annular fluids 98 exit jut pump 96 and flow back into tool bore 80.

After the pressure within annular work space 48 has been sufficiently reduced, work for the desired operation within annular work space 48 can be performed. Such work can be performed with tool assembly 104 of isolation tool 16. Tool assembly 104 can be stored within tool cavity 106 of isolation tool 16. Tool cavity 106 is a ring shaped recess within first ring body 24. Tool assembly 104 can include a platform that contains a variety of tools 114 that are selected for performing the particular desired task at the target location.

Figure 13:
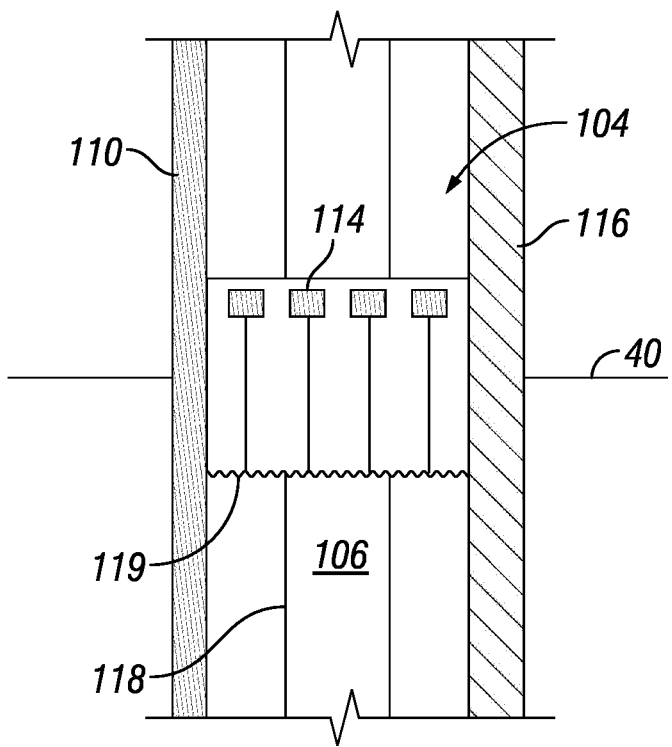
FIG. 13 is a top view of a tool assembly of an isolation tool, in accordance with an embodiment of this disclosure.

Looking at FIGS. 3 and 13, tool cavity 106 houses batteries 108, 110. Battery 108 provides power to components of isolation tool 16 such as central processing unit 112, motors, and other activation mechanisms for seals, brakes, and wheels. Central processing unit 112 can process data and provide commands to motors and other activation mechanisms for operation of isolation tool 16, such as commands for sealing, braking, operating tool door 116, and commands for performing tasks at the target location. Battery 110 can provide power to various work tools 114. Battery 110 can be ring shaped and circumscribe central axis 32 within tool cavity 106.

Tool cavity 106 can be sealed by tool door 116. Tool door 116 can be moved axially away from an open end of tool cavity 106 and towards second ring body 26 along support beam 40 on wheels that are powered by and part of tool motor assemblies 117. Moving tool door 116 towards second ring body 26 unseals and opens tool cavity 106. Opening tool cavity 106 also allows tool assembly 104 to be moved out of tool cavity 106. Moving tool assembly 104 out of tool cavity 106 provides tool assembly 104 with access to annular work space 48. Tool door 116 and tool assembly 104 can be moved and manipulated by a series of tool motor assemblies 117.

In order to access the work site of inner diameter surface 14 of pipe 10, tool assembly 104 can also be moved around a circumference of isolation tool 16 along a ring shaped tool guide 118, such as, for example on motorized wheels. Tool motor assemblies 117 can further be used to move tool assembly 104 around the circumference of isolation tool 16 on wheels that are part of tool motor assemblies 117.

Figure 14:
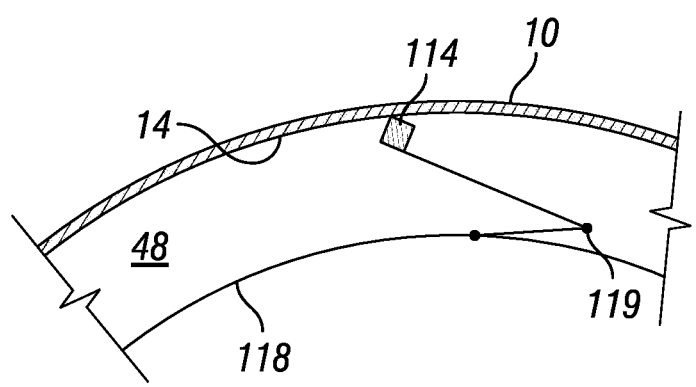
FIG. 14 is a section view of a tool assembly of an isolation tool, in accordance with an embodiment of this disclosure.

In order to reach inner diameter surface 14 of pipe 10, an end of tool assembly 104 can be rotated radially outward so that the individual work tools 114 can be proximate to, or in contact with, inner diameter surface 14 of pipe 10. Looking at FIG. 14, tool assembly 104 can rotate around hinge member 119 that is located at an edge of the platform so that the individual work tools 114 can be moved proximate to, or in contact with, inner diameter surface 14 of pipe 10.

Work tools 114 can be selected for performing the particular desired task at the target location. As an example, work tools 114 can include a laser for cutting or welding, a brush, a sponge, a mop, a coating nozzle, a cylinder or pressurized filler material, a cylinder of pressurized coating material, and inspection device such as an ultrasound.

After the desired work or operation has been performed, the pressure of annular work space 48 can be balanced with the pressure of pipe bore 18. Pressure balance line 120 provides fluid communication between annular work space 48 and pipe bore 18. Valve 122 can be used to control the flow of fluids through pressure balance line 120. Pressure balance line 120 can extend from annular work space 48 to tool bore 80 through second ring body 26. Pressure balance line 120 can allow fluids from pipe bore 18 to flow into annular work space 48 so that the pressure of annular work space 48 and pipe bore 18 are generally equivalent.

Sensors 124 can be used to measure characteristics of the fluid. As an example, sensors 4 can measure a pressure, temperature, oxygen level, and other compositional features of the fluid in pipe bore 18.

In order to retrieve isolation tool 16, first seal member 64 and upstream brakes 50 can be released so that first seal member 64 and upstream brakes 50 are spaced apart from inner diameter surface 14 of pipe 10. The force of the flow of fluid 22 through isolation tool 16 can then move first 24 axially towards second ring body 26 and compact isolation sheet 46. Second seal member 90 and downstream brakes 92 can be released so that second seal member 90 and downstream brakes 92 are spaced apart from inner diameter surface 14 of pipe 10. The force of the flow of fluid 22 through isolation tool 16 can then move isolation tool 16 in a direction downstream to be caught and retrieved from 18 pipe bore 18 of pipe 10.

Embodiments described in this disclosure therefore can provide systems and method for performing operations within a pipe bore such as, for example, treating internal metal loss, coating of the pipeline wall, replacing or maintaining pipe valves, or hot tapping, without operation shutdown. The operation can be performed in a lower pressure environment within an isolated annular work space and no excavation requirement for underground pipeline.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for isolating and performing work on a segment of a pipe through which a fluid flows, the method including:
   delivering an isolation tool to a target location of a bore of the pipe, the isolation tool having:
   a first ring body and a second ring body;
   a first seal member of the first ring body operable to form an annular seal between an outer diameter surface of the first ring body of the isolation tool and an inner diameter surface of the pipe when the first seal member is in an actuated position;
   a corrugated tube that extends between the first ring body and the second ring body, where the corrugated tube has a smaller maximum outer diameter than an inner diameter of the pipe, defining an annular work space between an outer diameter surface of the corrugated tube and the inner diameter surface of the pipe, the corrugated tube movable to an elongated position when the second ring body is moved in a direction away from the first ring body and moveable to a compacted position when the first ring body is moved in a direction towards the second ring body;
   a second seal member operable to form an annular seal between an outer diameter surface of the second ring body of isolation tool and the inner diameter surface of the pipe when the second seal member is in an actuated position;
   an ejector device of the isolation tool operable to reduce a pressure within the annular work space by removing fluids within the annular work space; and
   a tool assembly of the isolation tool operable for performing the work within the annular work space;
   actuating the first seal member of the first ring body to form the annular seal between the outer diameter surface of the first ring body of the isolation tool and the inner diameter surface of the pipe;
   moving the second ring body in the direction away from the first ring body and elongating the corrugated tube where the outer diameter surface of the corrugated tube and the inner diameter surface of the pipe define the annular work space;
   actuating the second seal member of the second ring body, the second seal member forming an annular seal between the outer diameter surface of the second ring body of the isolation tool and the inner diameter surface of the pipe;
   reducing a pressure within the annular work space by removing fluids within the annular work space with an ejector device of the isolation tool;
   performing work within the annular work space with a tool assembly of the isolation tool;
   balancing the pressure of the annular work space and a pressure of the bore of the pipe;
   releasing the first seal member;
   moving the first ring body in a direction towards the second ring body and compacting the corrugated tube;
   releasing the second seal member; and
   retrieving the isolation tool from the bore of the pipe.

2. The method of claim 1, further including before actuating the first seal member, applying brakes of a tool body of the isolation tool to maintain a position of the isolation tool within the pipe, and further including before retrieving the isolation tool releasing the brakes.

3. The method of claim 1, further including moving the tool assembly around a circumference of the isolation tool along a ring shaped tool guide.

4. The method of claim 1, where the first ring body includes a tool cavity with a sealed tool door, and performing work within the annular work space further includes:
   moving the tool door axially towards the second ring body, to unseal and open the tool cavity; and
   moving the tool assembly axially towards the second ring body and out of the tool cavity, providing the tool assembly access to the annular work space.

5. The method of claim 1, further including rotating an end of the tool assembly radially outward so that individual tools of the tool assembly are moved closer to an inner surface of the pipe.

6. The method of claim 1, where the isolation tool includes a tool frame including a central beam located along a central axis of the isolation tool, a first ring frame located axially outward of the first ring body, a second ring frame located axially outward of the second ring body, a plurality of spokes extending radially outward from the central beam, and a plurality of support beams extending between the first ring frame and the second ring frame.

7. The method of claim 1, where the isolation tool has a tool bore in fluid communication with the bore of the pipe, the tool bore providing a fluid flow path through the isolation tool for bore fluids, and where the ejector device includes a jet pump, the bore fluids being a motive fluid for the jet pump as the jet pump removes the fluids within the annular work space.

8. The method of claim 1, where the isolation tool has a tool bore in fluid communication with the bore of the pipe, the tool bore providing a fluid flow path through the isolation tool, and where elongating the corrugated tube is performed by a force of a flow of bore fluids through the tool bore.

9. A system for isolating and performing work on a segment of a pipe through which a fluid flows, the system including:
- an isolation tool having a first ring body and a second ring body and located at a target location of a bore of the pipe;
- a first seal member of the first ring body forming an annular seal between an outer diameter surface of the first ring body of the isolation tool and an inner diameter surface of the pipe when the first seal member is in an actuated position;
- a corrugated tube that extends between the first ring body and the second ring body, where the corrugated tube has a smaller maximum outer diameter than an inner diameter of the pipe, defining an annular work space between an outer diameter surface of the corrugated tube and the inner diameter surface of the pipe, the corrugated tube movable to an elongated position when the second ring body is moved in a direction away from the first ring body and moveable to a compacted position when the first ring body is moved in a direction towards the second ring body;
- a second seal member forming an annular seal between can outer diameter surface of the second ring body of the isolation tool and the inner diameter surface of the pipe when the second seal member is in an actuated position;
- an ejector device of the isolation tool operable to reduce a pressure within the annular work space by removing fluids within the annular work space; and
- a tool assembly of the isolation tool operable for performing the work within the annular work space.

10. The system of claim 9, further including brakes of a tool body of the isolation tool to maintain a position of the isolation tool within the pipe when applied and moveable to a released position for retrieving the isolation tool.

11. The system of claim 9, further including a ring shaped tool guide oriented to provide a path for moving the tool assembly around a circumference of the isolation tool.

12. The system of claim 9, where the first ring body includes a tool cavity with a sealed tool door, the door movable axially towards the second ring body to unseal and open the tool cavity.

13. The system of claim 9, where the tool assembly includes a hinge member operable to allow the tool assembly to rotate radially outward so that individual tools of the tool assembly are moved closer to an inner surface of the pipe.

14. The system of claim 9, where the isolation tool includes a tool frame including a central beam located along a central axis of the isolation tool, a first ring frame located axially outward of the first ring body, a second ring frame located axially outward of the second ring body, a plurality of spokes extending radially outward from the central beam, and a plurality of support beams extending between the first ring frame and the second ring frame.

15. The system of claim 9, where the isolation tool has a tool bore in fluid communication with the bore of the pipe, the tool bore providing a fluid flow path through the isolation tool for bore fluids, and where the ejector device includes a jet pump, the bore fluids being a motive fluid for the jet pump as the jet pump removes the fluids within the annular work space.

* * * * *